Sept. 30, 1947. M. G. HEALY 2,428,157
HALVING AND REAMING MACHINE FOR EXTRACTING JUICE FROM CITROUS FRUIT
Filed May 14, 1945 3 Sheets-Sheet 2

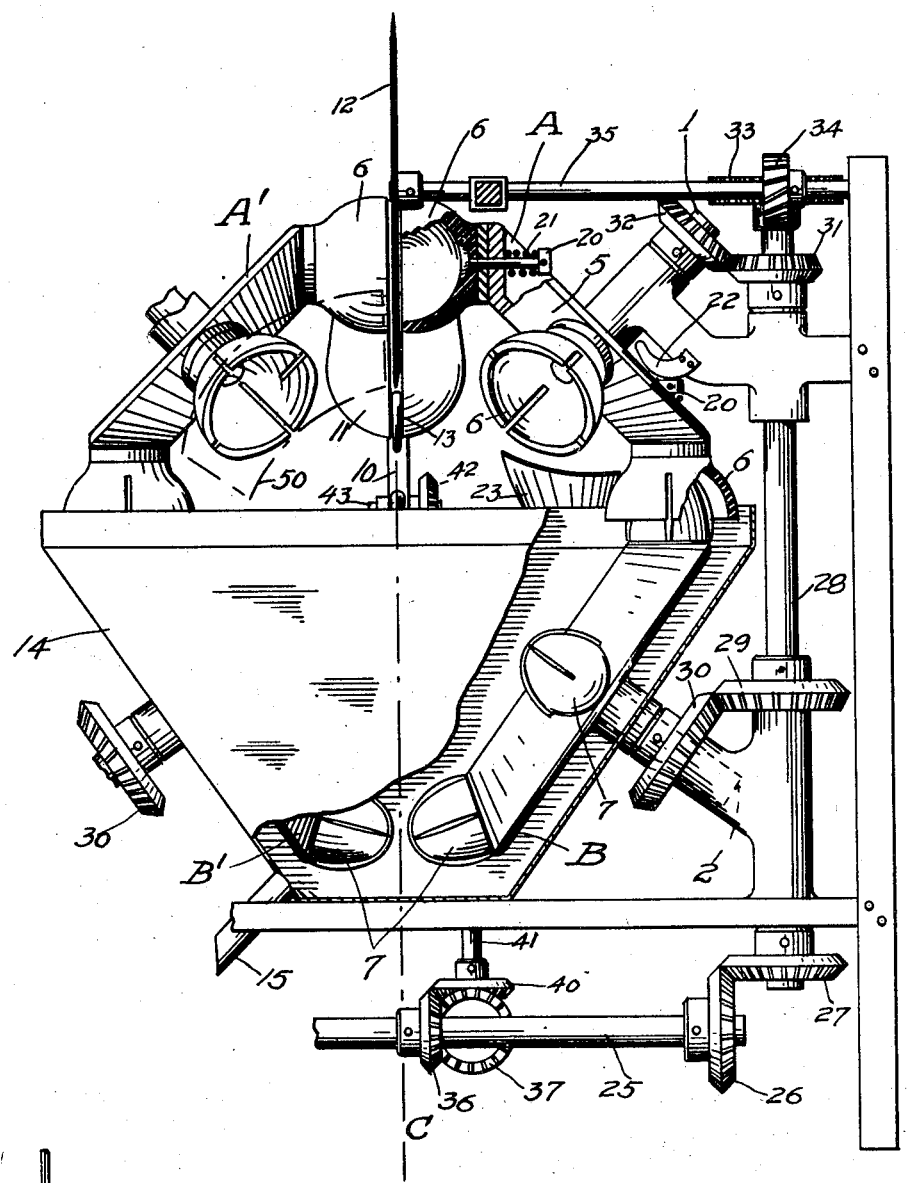

INVENTOR:
M. G. Healy.
BY OO Martin
ATTORNEY.

Patented Sept. 30, 1947

2,428,157

UNITED STATES PATENT OFFICE 2,428,157

HALVING AND REAMING MACHINE FOR EXTRACTING JUICE FROM CITROUS FRUIT

Marvin G. Healy, Montebello, Calif.

Application May 14, 1945, Serial No. 593,741

9 Claims. (Cl. 146—3)

The present invention relates to fruit juice extracting machines and more particularly to a device for extracting citrus fruit juice.

In such machines, it is customary to feed the fruit into opposed cups which carry the fruit through a bisecting knife to squeezing elements which enter the moving fruit to extract the juice. The most difficult problem in machines of this kind is to so arrange, fashion and proportion these interrelated moving parts that sufficient room may be provided to insure smooth and uninterrupted performance of this operation.

Having these and other related conditions in view, it is the general object of my invention to provide a simple, economical and convenient device in which ample room is present for the performance of fruit halving and juice extracting operations. To this end, the invention resides in the various combinations hereinafter fully described and illustrated in the accompanying drawings, of which:

Fig. 1 is an end elevational view, partly in section, of the most essential parts of a device embodying the invention;

Figs. 4 and 5 illustrate details of construction the importance of which will be hereinafter fully explained.

Figure 2:
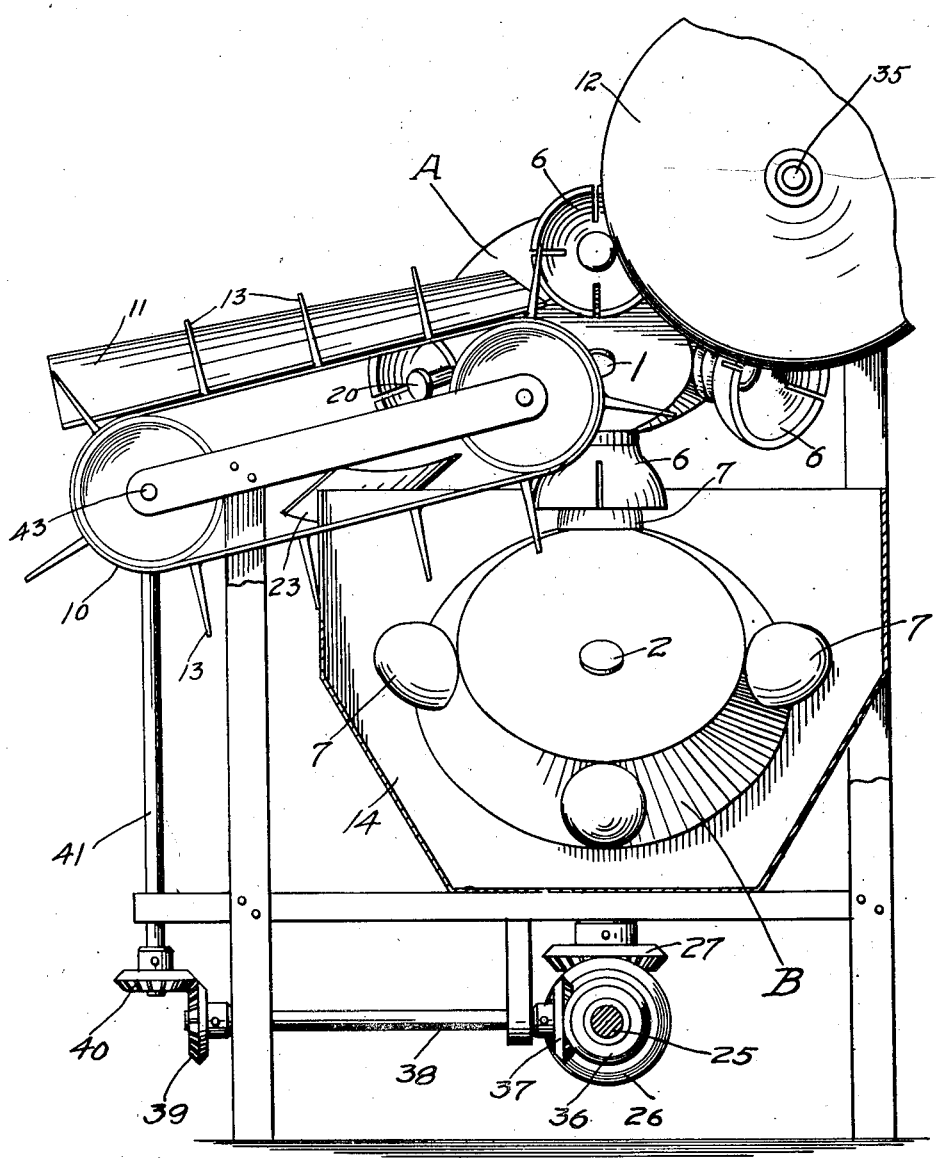
Fig. 2 is a corresponding side view of the machine taken substantially through the center thereof.

The structure of my invention in the form illustrated in Figs. 1 and 2, comprises right and left fruit carriers A, A' and reamer carriers B, B'. These carriers are symmetrically positioned relative to a vertical center line C, and as most of the mechanism is the same on both sides of this center line, it is to be understood that, with the exception of the driving mechanism, any part shown on one side of the center line will in practice also appear on the other side thereof.

Shafts 1 and 2 are set substantially at right angles to each other and their axes are diagonally directed relative to the center line C. To the shaft 1 is secured a frusto-conical disk 5, which supports a plurality of equidistantly spaced cups 6. The latter receive the halved fruit from a mechanism which will be described presently, and carry the fruit to reamers 7 of the reamer carrier B. The two carriers support each the same number of cups and reamers, which are all rotated at the same speed and so timed that the reamer will enter the cup as the two members approach each other and extend farthest into the cup when the cup and reamer reach axial alignment.

The mechanism delivering the fruit to the cups may, as best shown in Fig. 2, comprise a conveyor 10 which is positioned to pass the fruit through a split trough 11 to a knife 12, and the latter is placed in registration with the center line C. It is noticed that the conveyor is fitted with blades 13, which rise through the slit in the bottom of the trough one by one positively to advance the fruit deposited therein into the cups 6 of the fruit carriers A, A' as the cups approach the knife and to continue this advance movement until the two opposed cups reach and pass the position of alignment indicated in Fig. 1.

Before entering upon a detailed description of the various features and arrangements above briefly outlined, I wish to emphasize the importance of these features and arrangements. Many years of experience in the building and operation of fruit juice extracting machinery have taught me that the most difficult problem confronting the designer of such machinery is that of finding room for entering the fruit into the cups and for the reamer to enter into and to pass out of the cup. This has caused designers of such machinery to construct complicated cup structures which, by mechanical means are opened so as to afford room for the fruit and reamer to pass thereinto. But with the two sets of conical cup and reamer carriers, on shafts set substantially at right angles to each other and diagonally to the plane of the knife, I have found that these members move together and apart so rapidly, relative to the speed of rotation of the carriers, that ample clearance is present and that no cup opening means is required. However, because it is difficult correctly to assort the fruit to the exact same size before entering the machine, it may be found advisable to slit the cups, substantially as indicated, in order that the smaller fruit may be held by friction within the cups and the largest sizes be capable of entering thereinto. The cups should, of course, be made from resilient material, such as soft rubber, as usual in practice.

It is customary in machines of this kind to rotate the reamers as they enter the cups to extract the juice from the fruit carried therein and the reamers are in this case also connected for rotation but, for the sake of clearness, such connections are not illustrated in the drawings. It should be noted that the fruit juices extracted by the reamers drop into a casing 14 and are discharged through a spout 15.

As above stated, the halved fruit is held in the cups by friction and, because so held, may not always by gravity drop out of the cups when the reamers pass out of the cups. In order therefore to make certain that the residue of the fruit will be discharged, and also that the discharge will take place at a predetermined point, I have shown each cup fitted with a plunger 20 (see Fig. 1) which by a spring 21 is normally held retracted within the cup. A stationary cam 22 is so mounted on the framing of the machine in the path of movement of the plunger that the latter will commence to ride on the cam shortly after the reamer has commenced to withdraw from the cup and gradually to become advanced by the cam sufficiently to expel the fruit residue. A suitable plate or chute 23 is placed beneath the rising cup to catch the expelled waste and to carry it over the top edge of the casing 14 for disposal in any suitable manner.

Illustrative of means for driving the above described mechanisms, a shaft 25 is suitably connected for rotation by a prime mover (not shown), and this shaft is by bevel gears 26, 27 connected to rotate a vertical shaft 28. Bevel gears 29, 30 impart rotation from this shaft to the reamer carriers B, and bevel gears 31, 32 extend from said shaft to rotate the fruit carriers A. As above stated, the mechanism on both sides of the center line is identical, and so the driving mechanism on both sides thereof are also the same. Spiral gears 33, 34 connect the vertical shaft 28 with the knife shaft 35 to rotate the knife at a suitable speed.

The conveyor 10 should be moved at the proper speed to deliver the fruit one by one to the cups as they approach each other and reach the knife. Illustrative of means for driving the conveyor, a bevel gear 36 is mounted on the main shaft 25 to mesh with a gear 37 of a transverse shaft 38, and bevel gears 39, 40 are provided to rotate a vertical shaft 41. The latter is at the top fitted with a bevel gear (not shown) in mesh with a bevel gear 42 of the conveyor shaft 43. But other driving means may be substituted, if preferred. Because it is necessary for the conveyor blades positively to carry the fruit into the knife, and in order to avoid danger of collision between the blades and the knife, it may be found advisable to employ a bifurcated blade, such as shown at 16 in Fig. 5.

Figure 3:
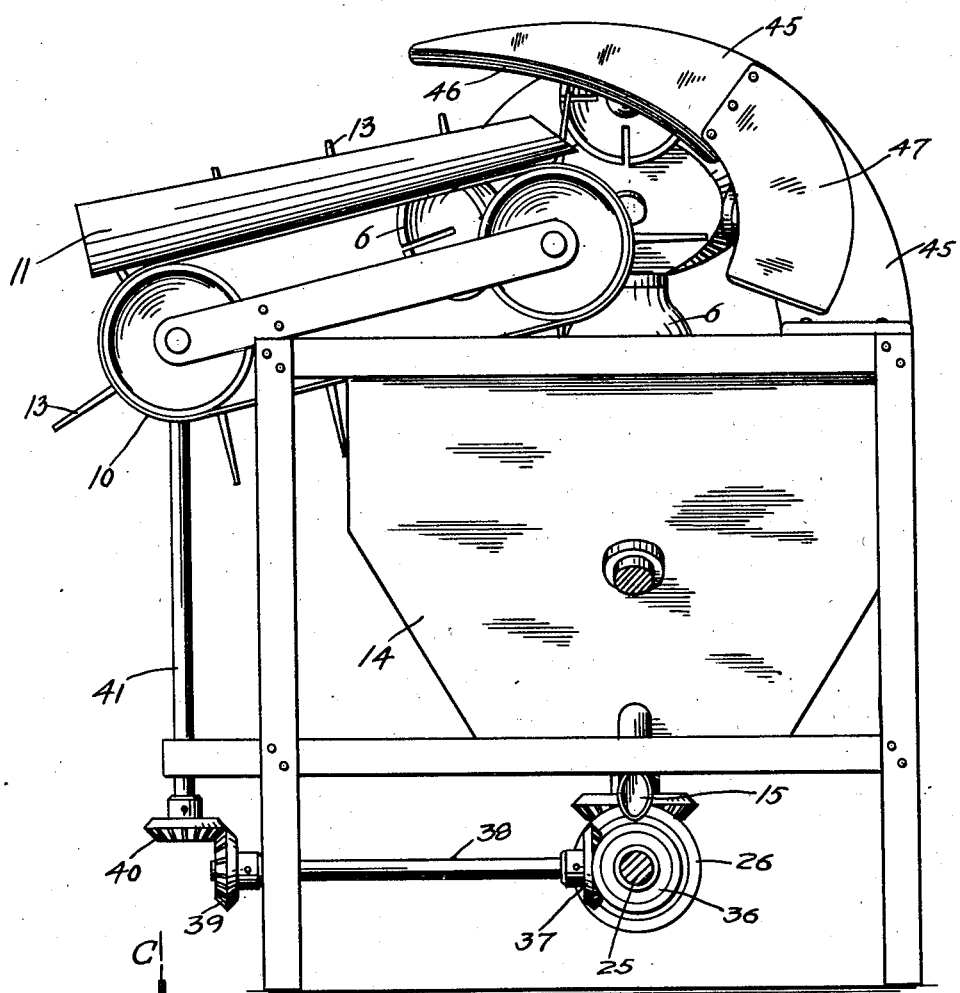
Fig. 3 is a side view of a slightly modified form of the invention and with the front portion of the upper part thereof removed for the sake of clearness.
Figure 4:
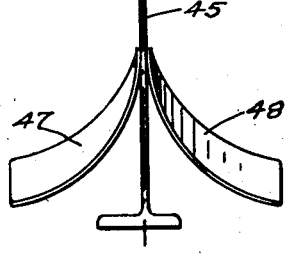

While the revolving type of knife is generally considered convenient and well adapted for use in fruit extracting machinery, some designers prefer to employ the simpler and less expensive stationary knife, and such arrangement is indicated in Fig. 3. The knife 45 is, like the knife 12, positioned on the vertical center line C, and its cutting edge 46 is downwardly curved, as usual in practice, to slice through the advancing fruit. It is important to note also, that the knife is fitted with a shield 47, 48, which extends right and left on curves substantially following the path of travel of the cups as they move away from the knife. The curved portions of the shield maintain any part of the fruit in position within the cups until the approaching reamer takes hold, should such fruit portion accidentally become loosened from the cup. And I wish it understood that a similar shield combination may be embodied in the structure of Figs. 1 and 2, substantially in position as indicated in dotted outline at 50 in Fig. 1. It is believed that any competent designer from the foregoing description and by reference to the drawings should be able to construct a device embodying the above features and arrangements.

While I have in the foregoing described and in the drawings illustrated preferred forms of the invention, it is not my intention to be limited to the exact shapes and arrangements of parts and features, but it should be understood that the invention includes such changes and modifications as will fall within the scope of the claims hereto appended.

I claim:

1. A pair of conical fruit carriers symmetrically positioned right and left relative to a vertical center line, a pair of conical reamer carriers similarly placed relative to said center line below the fruit carriers, said carriers all combining to form a substantially square frame bisected by said center line, equidistant resilient cups radially projecting from the conical surfaces of said fruit carriers, an equal number of reamers equidistantly projecting from the conical surfaces of said reamer carriers, means for rotating all of said carriers at the same speed to bring opposed cups of the fruit carriers into axial alignment at the top of the frame at the same time opposed cups and reamers reach axial alignment at the horizontal center of the frame, and means carrying fruit to the cups as they approach axial alignment at the top of the frame.

2. A pair of conical fruit carriers symmetrically positioned right and left relative to a vertical center line, a pair of conical reamer carriers similarly placed relative to said center line below the fruit carriers, all of said carriers combining to form a substantially square frame diagonally bisected by said center line, equidistant resilient cups radially projecting from the conical surfaces of said fruit carriers, an equal number of reamers equidistantly projecting from the conical surfaces of said reamer carriers, means for rotating all of said carriers at the same speed to bring opposed cups of the fruit carriers into axial alignment at the top of the frame at the same time that opposed cups and reamers reach axial alignment at the horizontal center of the frame, means carrying fruit to the cups as they approach axial alignment at the top of the frame, and means for bisecting the fruit entering the cups.

3. A pair of conical fruit carriers symmetrically positioned right and left relative to a vertical center line, a pair of conical reamer carriers similarly placed relative to said center line below the fruit carriers, all of said carriers combining to form a substantially square frame diagonally bisected by said center line, equidistant resilient cups radially projecting from the conical surfaces of said fruit carriers, an equal number of reamers equidistantly projecting from the conical surfaces of said reamer carriers, means for rotating all of said carriers at the same speed to bring opposed cups of the fruit carriers into axial alignment at the top of the frame at the same time that opposed cups and reamers reach axial alignment at the horizontal center of the frame, means carrying fruit to the cups as they approach axial alignment at the top of the frame, means for bisecting the fruit entering the cups, and means for expelling fruit waste from the cups upon completion of juice extraction.

4. A pair of conical fruit carriers symmetrically positioned right and left relative to a vertical center line, a pair of conical reamer carriers similarly placed relative to said center line below the fruit carriers, the carriers combining to form a substantially square frame bisected diagonally by said center line, equidistant resilient cups radially projecting from the conical surfaces of said fruit carriers, an equal number of reamers equidistantly projecting from the conical surfaces of the reamer carriers, means for rotating all of said carriers at the same speed to bring opposed cups of the fruit carriers into axial alignment at the top of the frame at the same time that opposed cups and reamers reach axial alignment at the horizontal center of the frame, means carrying fruit to the cups as they approach alignment at the top of the frame, a casing encompassing the lower portion of the carriers to receive the extracted juice, and means above said casing for carrying the fruit waste away from the machine.

5. In a citrus fruit extracting machine, a pair of conical fruit carriers symmetrically positioned right and left relative to a vertical center line, a pair of conical reamer carriers similarly placed relative to said center line, the carriers combining to form a substantially square frame diagonally bisected by said center line, equidistant resilient cups radially projecting from the conical surfaces of said fruit carriers, an equal number of reamers projecting from the conical surfaces of said reamer carriers, means for rotating all of the carriers at the same speed to bring opposed cups of the fruit carriers into axial alignment at the top of the frame at the same time that opposed cups and reamers reach axial alignment at the horizontal center of the frame, means carrying fruit to the cups as they approach axial alignment at the top of the frame, a circular knife blade mounted above said fruit carriers on the vertical center line and extending downward in position to bisect the fruit deposited in the cups, and means for rotating said knife blade.

6. In a citrus fruit juice extracting machine, a pair of conical fruit carriers symmetrically positioned right and left relative to a vertical center line, a pair of conical reamer carriers similarly placed relative to said center line below the fruit carriers, the carriers combining to form a substantially square frame diagonally bisected by said center line, equidistant resilient cups radially projecting from the conical surfaces of said fruit carriers, an equal number of reamers equidistantly projecting from the conical surfaces of the reamer carriers, means for rotating all of said carriers at the same speed to bring opposed cups of the fruit carriers into axial alignment at the top of the frame at the same time that opposed cups and reamers reach axial alignment at the horizontal center of the frame, means carrying fruit to the cups as they approach axial alignment at the top of the frame, means for bisecting the fruit entering the cups, plungers in the cups, resilient means yieldingly maintaining said plungers retracted within the cups, and a cam on the machine frame in the path of travel of said plungers and shaped to advance the plungers to expel waste matter left in the cups upon completion of the juice extracting operation.

7. In a fruit juice extracting machine, a pair of upper conical fruit carriers and a pair of lower conical reamer carriers, all of said carriers arranged symmetrically right and left of a common vertical center line to form a substantially square frame diagonally bisected by said center line, resilient cups equidistantly mounted on the fruit carriers and so directed as to reach horizontal axial alignment in their uppermost position and being vertically directed downward in their lowermost position, reamers on said reamer carriers, and means for rotating all of said carriers at the same speed to bring the reamers into the cups as the latter reach their lowermost position.

8. In a citrus fruit juice extracting machine, a pair of upper conical fruit carriers, a pair of lower conical reamer carriers, all of said carriers being arranged symmetrically right and left of a vertical center line to form a substantially square frame diagonally bisected by said center line, resilient cups equidistantly mounted on the fruit carriers and so directed as to reach axial alignment in their uppermost position and being vertically directed downward in their lowermost position, reamers on said reamer carriers, means for rotating all of the carriers at the same speed to bring the reamers as they reach their uppermost position into the cups in the lowermost position of the latter, a knife blade on the vertical center line extending from above carriers into position for bisecting the fruit deposited in the opposed cups at the top of the frame, and shields extending from said blade on curves substantially following the path of travel of the cups as they carry the bisected fruit away from the blade.

9. A pair of conical fruit carriers symmetrically positioned right and left relative to a vertical center line, a pair of conical reamer carriers similarly placed relative to said center line below the fruit carriers, all of said carriers combining to form a substantially square frame diagonally bisected by said center line, equidistant resilient cups radially projecting from the conical surfaces of said fruit carriers, an equal number of reamers equidistantly projecting from the conical surfaces of said reamer carrier, means for rotating all of said carriers at the same speed to bring opposed cups of the fruit carriers into axial alignment at the top of the frame at the same time that opposed cups and reamers reach axial alignment at the horizontal center of the frame, means carrying fruit to the cups as they approach axial alignment at the top of the frame, a shaft above said fruit carriers, a circular disc on the end of said shaft extending between the fruit carriers in position to commence bisecting the fruit deposited in the cups of said carriers after said cups have reached axial alignment, and means for rotating said shaft and knife.

MARVIN G. HEALY.

REFERENCES CITED

The following references are of record in the file of this patent:

UNITED STATES PATENTS

| Number | Name | Date |
|---|---|---|
| 1,386,552 | Carney | Aug. 2, 1921 |
| 1,888,529 | Faulds | Nov. 22, 1932 |
| 2,017,960 | Faulds | Oct. 22, 1935 |
| 2,130,610 | Brown | Sept. 20, 1938 |
| 2,199,876 | Brown | May 7, 1940 |
| 2,354,721 | Walker et al. | Aug. 1, 1944 |